US007173467B2

(12) United States Patent
Liu

(10) Patent No.: US 7,173,467 B2
(45) Date of Patent: Feb. 6, 2007

(54) MODIFIED HIGH-EFFICIENCY PHASE SHIFT MODULATION METHOD

(75) Inventor: Yi-Hwa Liu, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 159 days.

(21) Appl. No.: 11/095,436

(22) Filed: Mar. 31, 2005

(65) Prior Publication Data

US 2006/0221648 A1 Oct. 5, 2006

(51) Int. Cl.
*H03K 5/13* (2006.01)

(52) U.S. Cl. ...................................................... 327/242

(58) Field of Classification Search ................ 327/177, 327/176, 231, 236; 363/17, 132, 41
See application file for complete search history.

(56) References Cited

U.S. PATENT DOCUMENTS 3,571,686 A * 3/1971 Henegar .................... 318/624

* cited by examiner

*Primary Examiner*—Shawn Riley
(74) *Attorney, Agent, or Firm*—Alan D. Kamrath; Nikolai & Mersereau, P.A.

(57) ABSTRACT

Disclosed is a high-efficiency phase shift modulation method suitable for use in a traditional DC/AC single-phase full-bridge inverter. In this method, phase-shifted signal timing is used to modulate a duty cycle so that a power transistor is operated in a zero voltage switching state. As such, noises and switching loss of a switching device when turned on or off, may be reduced and thus efficiency of the inverter may be promoted. With this high-efficiency phase shift modulation method, at least the following advantages may be achieved: lower switching stresses, lower switching losses and thus increased conversion efficiency, lower electromagnetic interferences (EMIs) and no additional circuit required and thus easier realization of a controller for the inverter.

4 Claims, 21 Drawing Sheets

Main switching device

Controller

OSC

Basic square wave generation (A, B)

Dead time generation circuit

Phase-shift circuit (C, D)

Comparator and counter

MODIFIED HIGH-EFFICIENCY PHASE SHIFT MODULATION METHOD

BACKGROUND OF THE INVENTION

1. Field of Invention

The present invention is related to a traditional DC-AC single-phase full-bridge inverter. Particularly, the present invention is related to a method of operating a switching device in an inverter in a soft switching mode so as to promote efficiency of an inverter, reduce a rating value required for the switching device, reduce electromagnetic interferences caused by switching operations on the switching device and increase switching frequency of the switching device.

2. Related Art

With rapid development of semiconductor technology used in integrated circuits, electronic products are marching to have the features of slightness and compactness. For a current high efficiency inverter, it typically has an operating frequency of over than 20 kHz so as to stay away from an audio frequency band. When a hard switching manner is used, a power transistor in the inverter will have a greater switching loss as switching frequency thereof increases, resulting in a greater power loss. In this case, a considerable large heat sink is required for heat removing. As such, not only volume of the heat sink has to be increased but also efficiency of the inverter is reduced. To resolve this problem, a soft switching method has been suggested to be utilized. FIG. 1 is a schematic diagram of a prior power switch upon which the hard switching method is applied. In this case, a voltage $V_{DS}$ across on the transistor will rise abruptly and a voltage pulse will thus take place when the switch is cut off. This voltage pulse may have a value greater than an input voltage $V_{SLP}$ of the power switch and increase the voltage stress of the power switch. On the other side, when the switch is turned on, a current pulse greater than a normal current $I_{SLP}$ is arisen at an instant after the switch is turned on due to an output capacitor of the switching device, resulting in an increase stress of the power switch. In summary, the power switch either has a non-zero voltage or has a non-zero current irrespective of the turn-on or cut-off state itself and thus a pulse bringing about a power loss is generated in any state. Accordingly, switching loss may be seen at a time when current alternation occurred in the power switch no matter turn-on or cut-off state is stayed, shown in FIG. 1.

Referring to FIG. 2, waveforms of a voltage and a current of the-prior power switch when a hard switching operation is conducted thereon are shown therein. As shown, upon the power switch being turned on, the current thereof increases. In a $t_r$ period where the current begins and increases, a current spike is arisen owing to an output capacitor and stray capacitance of the power switch. However, since the voltage at this moment is still very high, which is equal to an input voltage $V_{SLP}$. Therefore, a power loss is caused during the time period $t_r$. On the other hand, when the power switch is cut off, a voltage drop between the power switch thereof increases abruptly and a voltage spike is generated. However, since the current $I_{DS}$ of the power switch has not decreased down to zero at this time, a lower loss is also resulted during the time period $t_f$ when the power switch is cut off.

Referring to FIG. 3, a schematic diagram showing waveforms of a voltage and a current of a power switch when a soft switching operation is conducted thereon is illustrated therein. As shown, after the power switch is turned on and when the current begins and increases during a time period of $t_r$, the voltage of the power switch is zero. This behavior is generally called zero voltage switching (ZVS). On the other hand, when the power switch is cut off, the voltage rises only after the current is decreased to zero. This behavior is called zero current switching (ZCS). In this manner, switching loss is greatly reduced and overall efficiency of the inverter is thus promoted. In view of the above, a main difference between the hard and soft switching methods is the state when the power switch is switched. The differences are listed in Table 1.

The soft switching technology suitable to be used in a DC-AC inverter may be achieved by the following three configurations, which are classified based on their architectures: (1) Addition of a resonance network at the load side of the inverter, (2) Addition of a resonance network provided at a bridge of the inverter and (3) Addition of a resonance network at a DC link of the inverter. These three configurations of inverter will be explained as follows.

<The Soft Switching Method Applied in a Configuration where a Resonance Network is Added at the Load Side of the Inverter>

This kind of soft switching method may be further classified into two methods based on if a series resonance network or a parallel resonance network is added. In the series resonance network configuration, a square-wave voltage is transmitted from a bridge of the inverter to the series resonance network. Examples of such series resonance network configuration are provided herein for reference. F. C. Schwarz set forth "A method of resonant current pulse modulation for power converters," IEEE Trans. on Industrial Electronics, Control and Instrument, Vol. IECI-17, pp. 209–221, June 1970. Kifune, H.; Hatanaka, Y; Nakaoka, M. disclosed "Quasi-series-resonant-type soft-switching phase shift modulated inverter", IEE Proceedings—Electric. Power Applications, Volume: 150, Issue: 6, 7 Nov. 2003, Pages: 725–732. The two prior arts are related to a configuration where the load and the series resonance network are connected in series. N. Mapham proposed "An SCR converter with good regulation and sine-wave output," IEEE Transactions on. Industrial Generation Application, Vol. IGA-3, pp. 176–187, March/April 1967. Chien-Ming Wang set forth "Nonlinear-controlled strategy for soft-switched series-resonant DC/AC inverter without auxiliary switches", IEEE Transactions on Power Electronics, Volume: 18, Issue: 3, May 2003, Pages: 764–774. The two prior arts are related to a configuration where the load and the series resonance network are connected in parallel. Since the series resonance manner is used to obtain the result of zero current switching, a main limitation of the corresponding configuration lies in that the switching frequency may not be higher than the resonance frequency. Further, regulation of the output voltage or current of the inverter may become worse when resonance frequency of the power switch shifts owing to aging or production inconsistency of the power device occurred.

In the parallel resonance network configuration, a square-wave current is transmitted from a bridge of the inverter to the parallel resonance network. J. G Kassakian set forth "A new current mode sine wave inverter," IEEE Transactions on Industrial Applications, Vol. 18, pp. 273–278, May/June 1982. V Chudnovsky, B. Axelrod and A. L. Shenkman disclosed "An approximate analysis of a starting process of a current source parallel inverter with a high-Q induction heating load," IEEE Transactions on Power Electronics, Vol. 12, pp. 294–301, March 1997. The two prior arts are related to a configuration where the load and the parallel resonance network are connected in parallel. M. K. Kazimierczuk and R. C. Cravens II proposed "Current-source parallel resonant DC/AC inverter with transformer," IEEE Transactions on Power Electronics, Vol. 11, pp. 275–284, March 1996, which are also related to the configuration where the load and the parallel resonance network are connected in parallel. Since an AC voltage may be caused in the power switch owing to the parallel resonance network, the power switch has to be provided with capability of isolating a reverse voltage or has to be added additionally with a diode to block this reverse voltage.

In short, the soft switching purpose may be achieved by addition of a resonance network at the load side. The configuration with the resonance network added at the load side is more suitable to be used when a fixed load is utilized. In the case of a large load variation occurred, this kind of soft switching techniques will perform poorer.

<Soft Switching Method Applied in a Configuration where a Resonance Network is Added at a Bridge of the Inverter>

For the configuration where a resonance network is added at a bridge of the inverter, an input voltage of the inverter has a fixed voltage or current. R. Tymerski, V. Vorp'erian, and F. C. Lee set forth "DC-to-AC inversion using quasiresonant techniques," Transactions on Power Electronics, Vol. 4, pp. 381–390, October 1989, which is a configuration where quasi-resonant zero voltage switching technology is used. To achieve the zero voltage switching, the power switch has to endure a greater current. Further, performance of this method is dependent on the resonant inductance and it is difficult to achieve the purpose of zero voltage switching for some inductance values. In addition, this method is not suitable to be used where an inductance load is used at an output of such as a motor-driven control. J.-S. Lai, R. W Young, G. W. Ott, Jr., J. W. McKeever, and F. Z. Peng, disclosed "A delta-configured auxiliary resonant snubber inverter," IEEE Transactions on. Industrial Applications, Vol. 32, pp. 518–525, May/June 1996. Smith, K. M., Jr.; Smedley, K. M. proposed "Lossless passive soft-switching methods for inverters and amplifiers", IEEE Transactions on Power Electronics, Volume: 15, Issue: 1, January 2000, Pages: 164–173. In the two prior arts, the soft switching purpose is achieved by providing additionally a resonant snubber. An advantage of such circuit is that the circuit may be operated in cooperation with a pulse width modulation method. However, a passive resonant snubber is necessary and complexity of the circuit is increased. Smith, K. M., Jr.; Smedley, K. M. set forth "Intelligent magnetic-amplifier-controlled soft-switching method for amplifiers and inverters", IEEE Transactions on Power Electronics, Volume: 13, Issue: 1, January 1998, Pages: 84–92, in which a resonant circuit is added at a bridge of the inverter to achieve the purpose of soft switching. However, an auxiliary switch and a resonant circuit comprising passive devices for resonance are required to be additionally provided, increasing relatively the cost of the inverter.

In short, such inverter with the resonance circuit added at one of the bridges thereof is achieved with respect to the purpose of soft switching mostly based on the provision of the auxiliary switch. Such kind of inverter is operated based on the principle where the input and the load thereof, when zero voltage switching is to be achieved, have to form an parallel resonance circuit when the auxiliary switch is turned on, while the input and the load thereof, when zero current switching is to be achieved, have to form an series resonance circuit when the auxiliary switch is turned on. In addition, control timing for the auxiliary switch of such configuration has to be particularly designed, increasing complexity of the associated circuit.

<Soft Switching Method Applied in a Configuration where a Resonance Network is Added at the DC Link of the Inverter>

The soft switching method applied in a configuration where a resonance network is added at the DC link of the inverter may be classified into two types, including one having an AC voltage and current at a DC link side and one having a DC voltage and current at the same. P. K. Sood and T. A. Lipo, set forth "Power conversion distribution system using a high-frequency AC link," IEEE Transactions on. Industrial Applications, Vol. 24, pp. 288–299, March/April 1988, in which a DC link resonance network is used to resonate the input voltage into an AC form so as to the achieve the purpose of soft switching. In such configuration, a cyclocoverter mode is utilized. A disadvantage of such configuration is that the switch has to endure the AC voltage and the output may not be applied with the commonly used pulse width modulation method but requires to be processed by means of discrete pulse modulation (DPM). Yie-Tone Chen disclosed "A new quasi-parallel resonant DC link for soft-switching PWM inverters", IEEE Transactions on Power Electronics, Volume: 13, Issue: 3, May 1998, Pages: 427–435. Xiangning He; Kuang Sheng; Williams, B. W.; Zhaoming Qian; Finney, S. J. proposed "A composite soft-switching inverter configuration with unipolar pulsewidth modulation control", IEEE Transactions on Industrial Electronics, Volume: 48, Issue: 1, February 2001, Pages: 118–126. The two prior arts achieve the purpose of soft switching by adding a parallel quasi-resonant network at the DC link side. According to this method, a negative voltage will never present at the DC link side and hence the switch does not necessarily have to endure an AC voltage. In achieving this purpose, the auxiliary switch has to be additionally provided, which requires more complex control timings.

In view of the above, shortcomings are encountered in the prior arts. In this regard, the inventors of this invention have engaged in intensive research and tried to look for efficient and practicable solutions. After many tests and efforts, a modified high-efficiency phase-shift modulation method is set forth.

SUMMARY OF THE INVENTION

It is, therefore, an object of the present invention to provide a modified high-efficiency phase-shift single-phase full-bridge inverter, in which a phase shift is introduced to a gate control signal for a power transistor provided on a diagonal line by a phase shift modulation method so as to achieve purpose of soft switching of the power transistor. As such, power loss of the power switch may be reduced and thus an unnecessary resonant snubber circuit may be eliminated, conversion efficiency of the inverter may be improved, and electromagnetic interferences (EMIs) of the inverter may be reduced and thus switching frequency of the power switch may be increased.

To achieve the above object, the present invention provides a basic circuit of a modified high-efficiency single-phase full-bridge inverter. In an embodiment shown in FIG. 4, four power switches (A–D) constitute a full-bridge arrangement with an output formed by a low-pass filter circuit constituted by an inductor $L_O$ and an output capacitor $C_O$, wherein $C_A$ to $C_D$ are parasitic capacitors of the power swicthes A–D, $D_A$–$D_D$ are body diodes of the MOSFETs.

FIG. 5 is a timing diagram of a gate control signal and output voltages $V_{OUT}$ of the switching devices A to D, in which a dead time existed since upper and lower bridges of the full-bridge voltage source inverter may not turn on simultaneously which causes a high voltage and a large current burning down the power device. Another reason to provide the dead time is to achieve the purpose of zero voltage switching.

As viewed from FIG. 5, it may be known that the modified high-efficiency phase-shift modulation method according to the present invention is achieved based on that the duty cycles for the switches A and B are fixed at 50% and the duty cycles of the switches C and D are variable so that the purpose of energy transmission may be achieved. It may be known from FIG. 4, a load voltage of $+V_{SLP}$ is obtained when the switches A and C (arranged at positions diagonal to each other) turn on simultaneously. On the other hand, a load voltage of $-V_{SLP}$ is obtained when the switches B and D (arranged at positions diagonal to each other) turn on simultaneously. Hence, the load has a positive voltage and a negative voltage of different periods when the switches A to D are in a cycle sequentially turned on in a switching cycle. Since the switching frequency employed in the phase-shift modulation has to be far higher than that of the desired AC output voltage, the positive and negative voltages mentioned above should be processed by a filter circuit ($L_O$ and $C_O$ in FIG. 4). When the positive voltage on the load has a greater period than that of the negative voltage, the filtered voltage is positive. On the other hand, when the positive voltage on the load has a less period than that of the negative voltage, the filtered voltage is negative. Based on the principle, the modified high-efficiency phase-shift modulation technology according to the present invention may generate an AC voltage at the output of the inverter.

To enable persons of the art to fully understand the foregoing objects, other objects, features and effectiveness of the present invention, the present invention will be explained below in more detail through the preferred embodiments along with the accompanying drawings in an exemplary sense. Any modification or variation deduced from spirits of the present invention is to be deemed within the scope of the present invention.

BRIEF DESCRIPTION OF THE DRAWINGS

The invention will become more fully understood from the detailed description given herein below illustration only, and thus are not limitative of the present invention, and wherein.

Table 1 shows differences between a hard switching manner and a soft switching manner for an inverter.

DETAILED DESCRIPTION OF THE INVENTION

To completely describe the operational principle of a basic circuit of a modified high-efficiency phase-shift single-phase full-bridge inverter for each mode, a modified high-efficiency phase-shift modulation method used to be applied thereon is divided into eight operating modes for each duty cycle and each of the operating modes will be explained in detail below.

Figure 1:
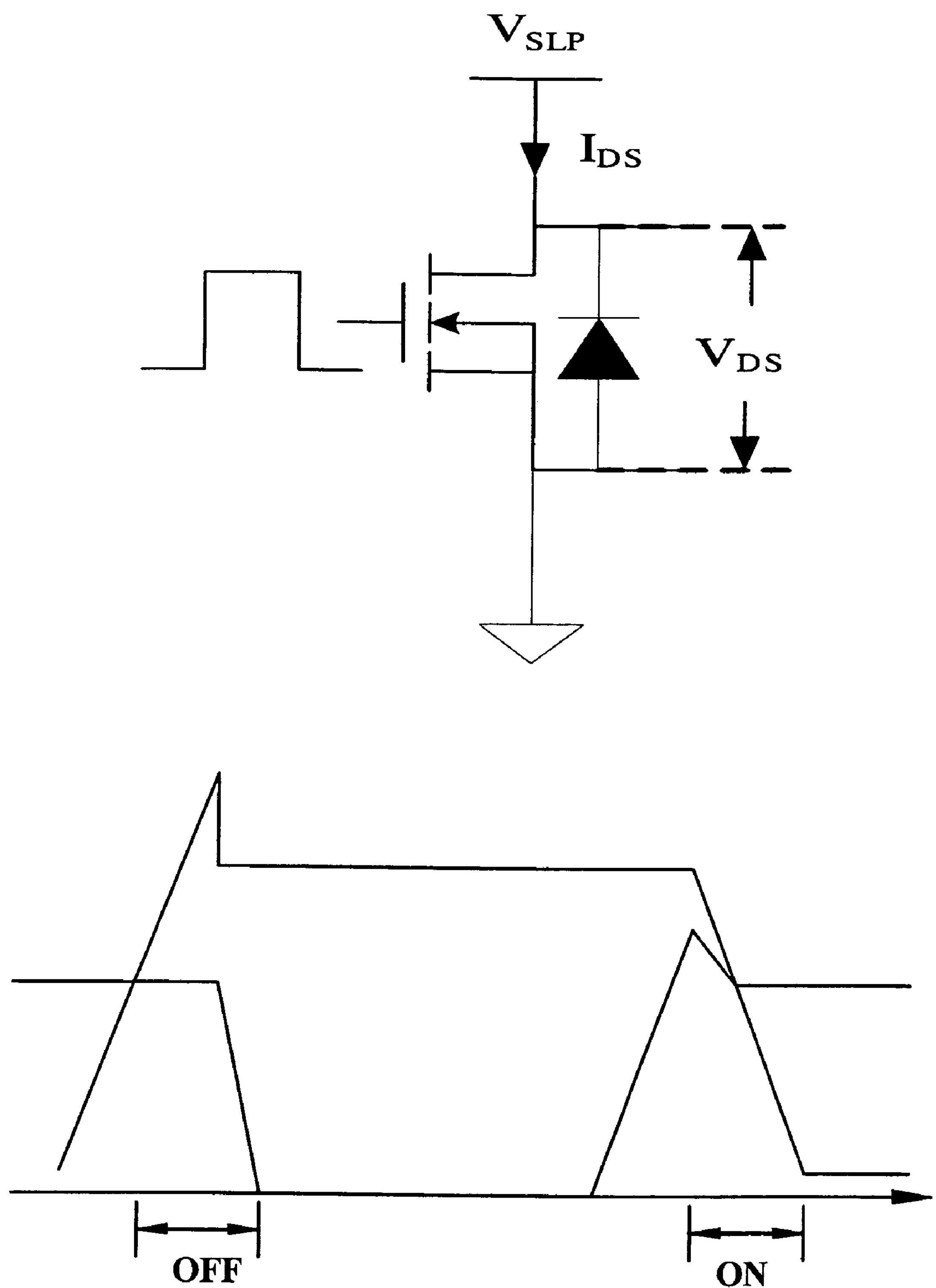
FIG. 1 is a schematic diagram showing a prior power switch upon which the hard switching method is applied.
Figure 2:
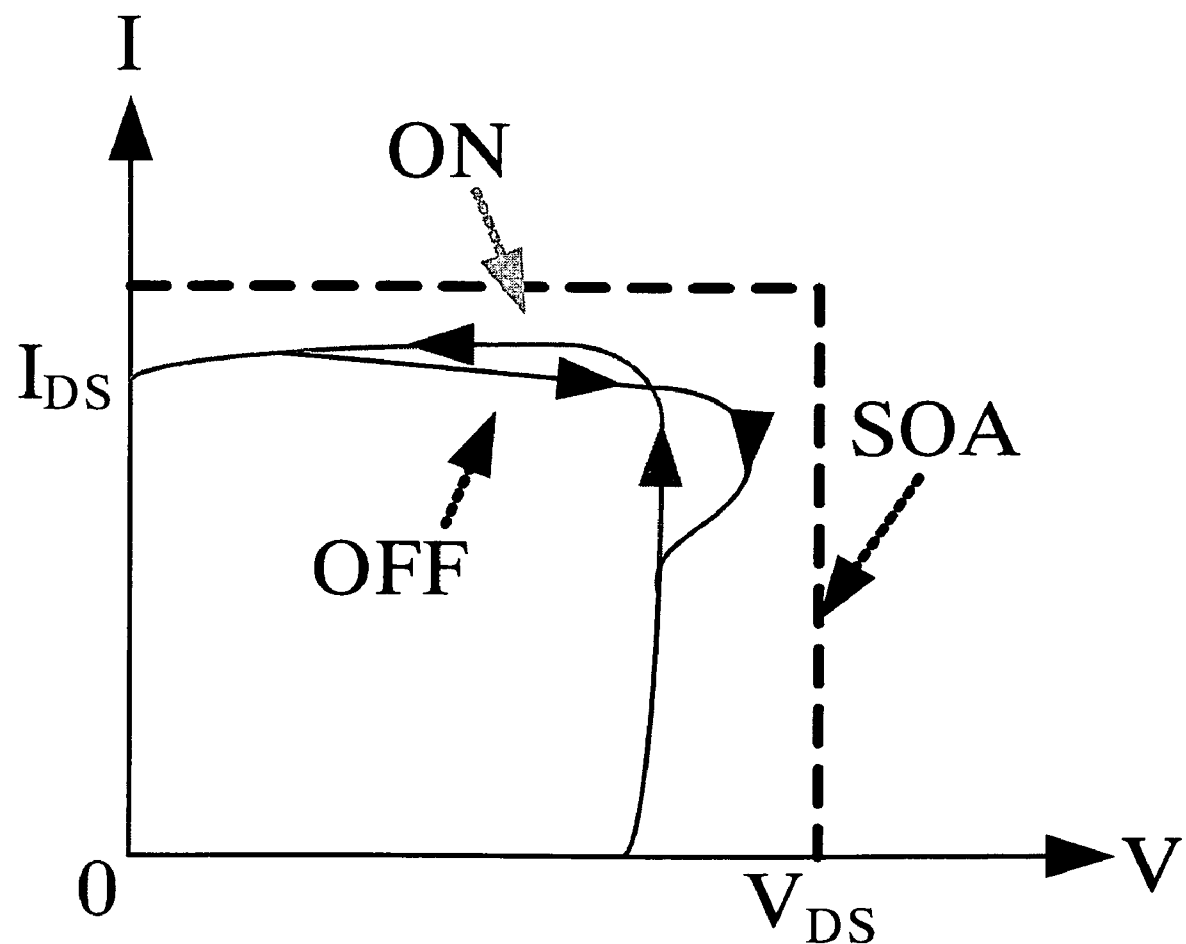
FIG. 2 shows waveforms of a voltage and a current of the prior power switch when the hard switching operation is conducted thereon according to the present invention.
Figure 3:
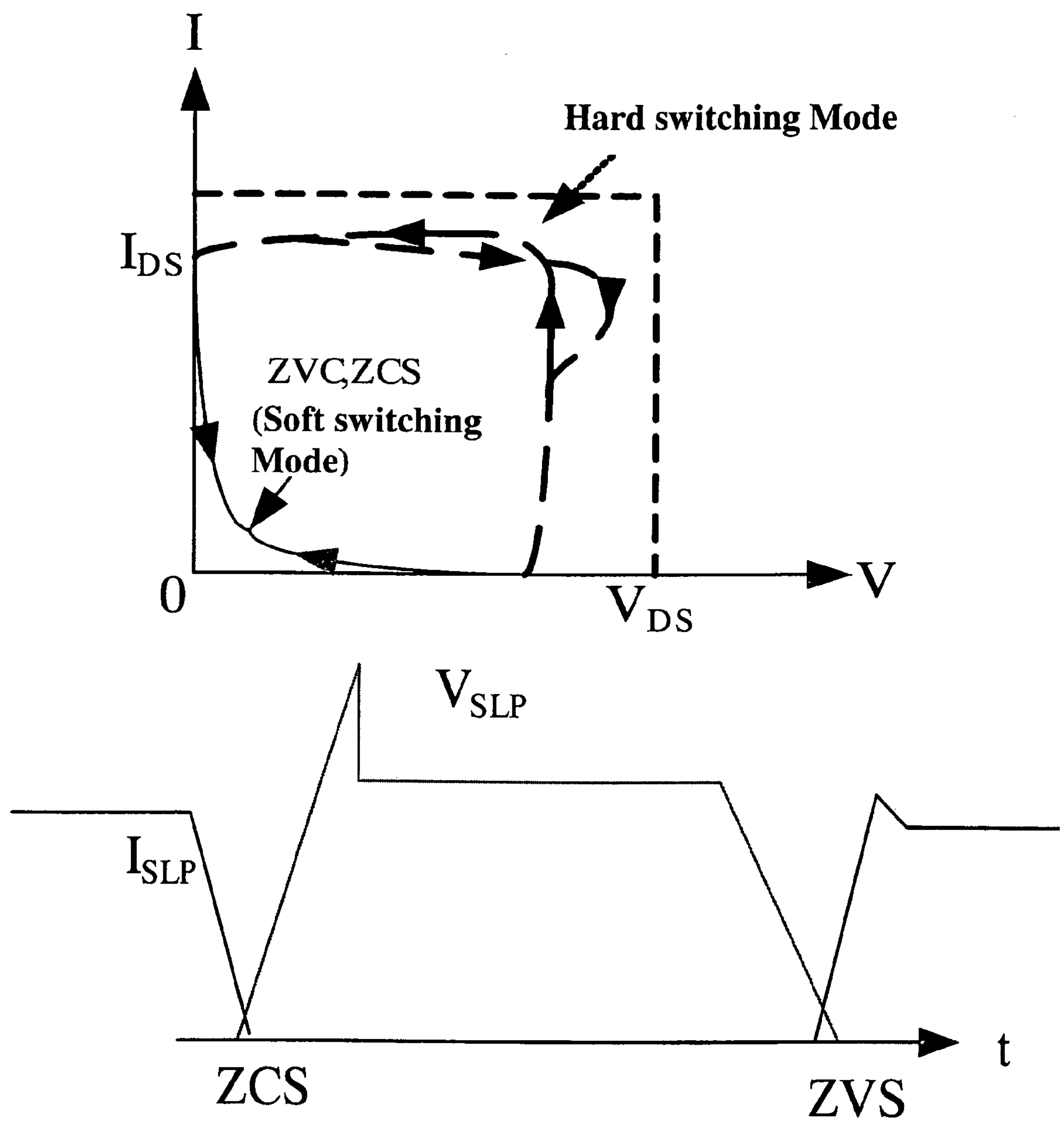
FIG. 3 is a schematic diagram showing waveforms of a voltage and a current of the prior power switch when the soft switching operation is conducted thereon according to the present invention.
Figure 4:
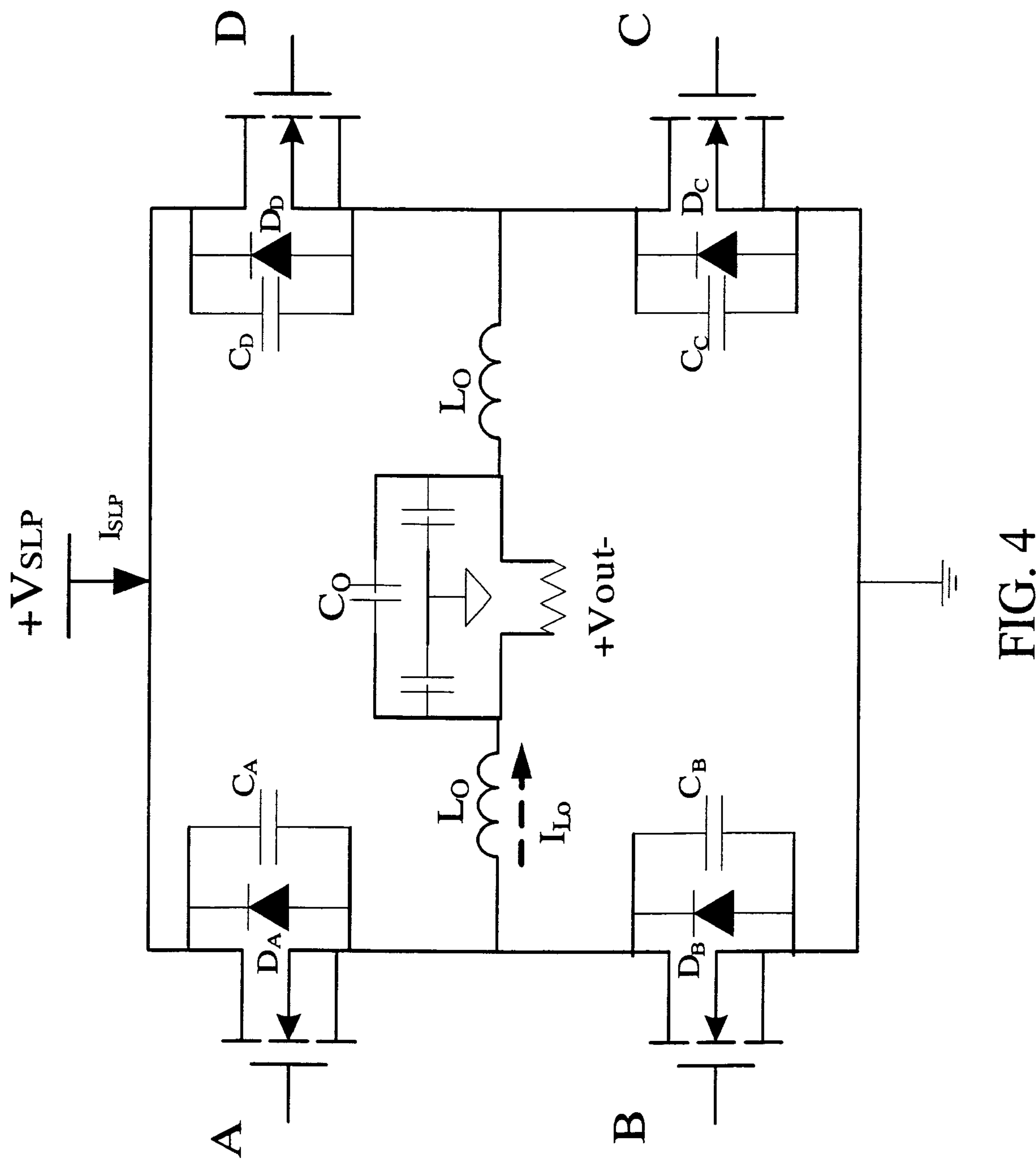
FIG. 4 is a schematic diagram showing an embodiment of a basic circuit of a modified phase-shift single-phase full-bridge inverter according to the present invention.
Figure 5:
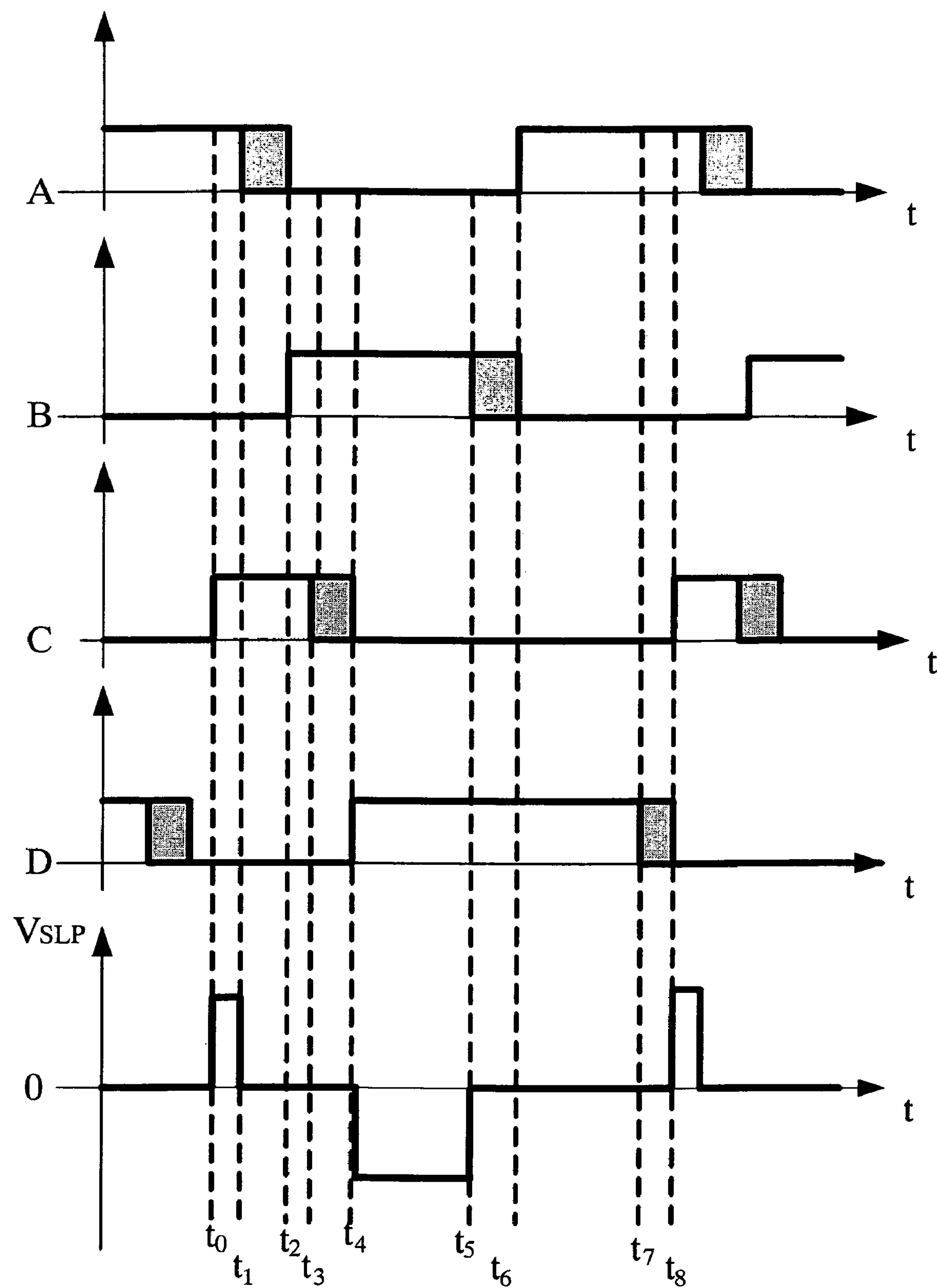
FIG. 5 is a timing diagram showing a gate control signal and output voltages of the switching devices A to D according to the present invention.
Figure 6:
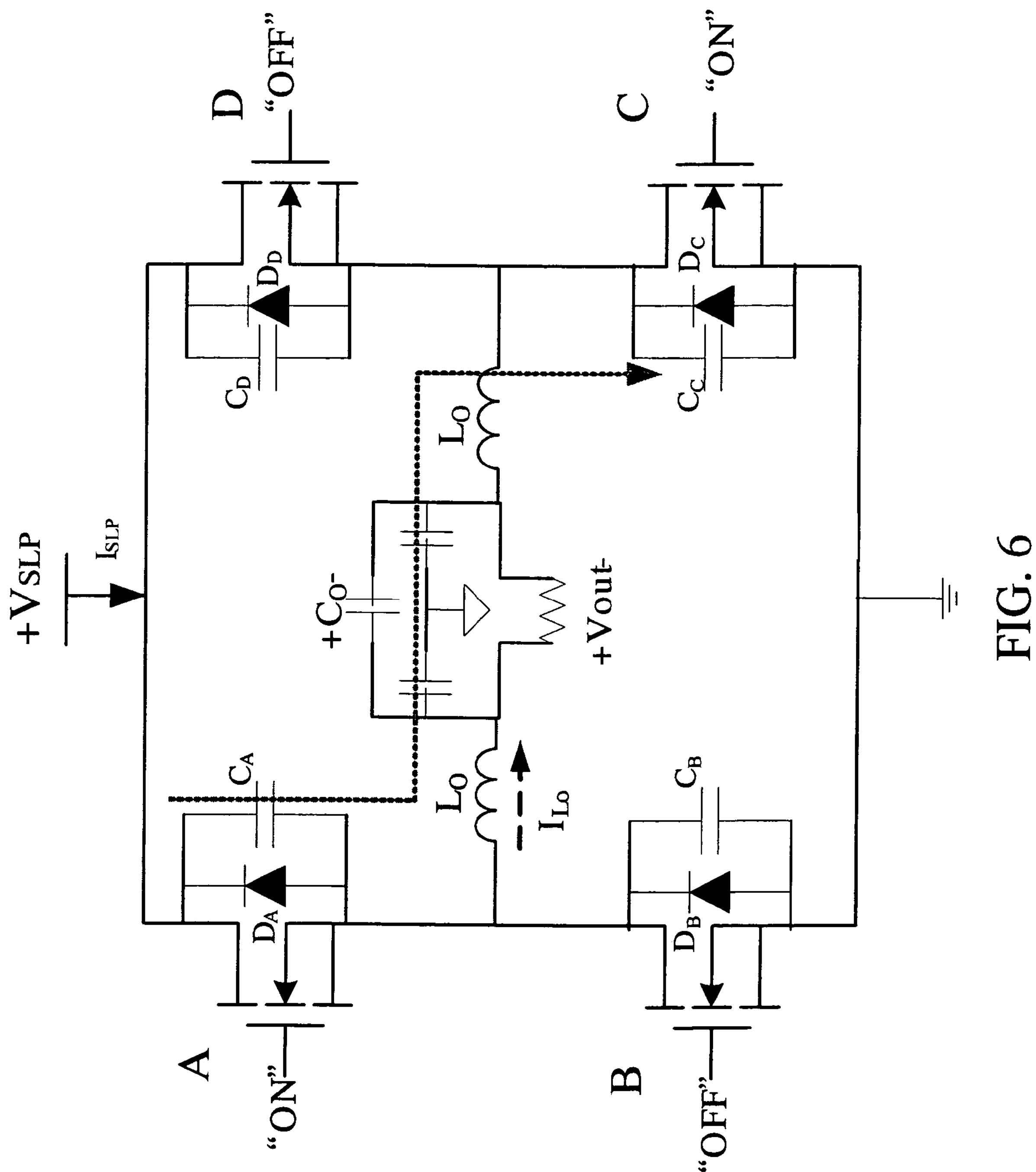
FIG. 6 is a schematic diagram showing that energy is transmitted to a load in the inverter when operated in Mode I according to the present invention.

$(t_0 \leqq t \leqq t_1)$ Mode I:

During this period, power switches A and C are turned on while power switches B and D are cut off. In the circuit, a current is flown in a positive direction and charges an output inductor $L_O$ and an output capacitor $C_O$. A current $I_{LO}$ has a final value of $I_{LO}$ ($t_1$) equal to $I_{SLP}$, a voltage of the capacitor $C_O$ has a final voltage $V_{CO}$ ($t_1$) equal to $V_{SLP}$. All polarities for the above power switches are shown in FIG. 6. At this time, an output voltage of the circuit $V_{out}=V_{SLP}$.

Figure 7:
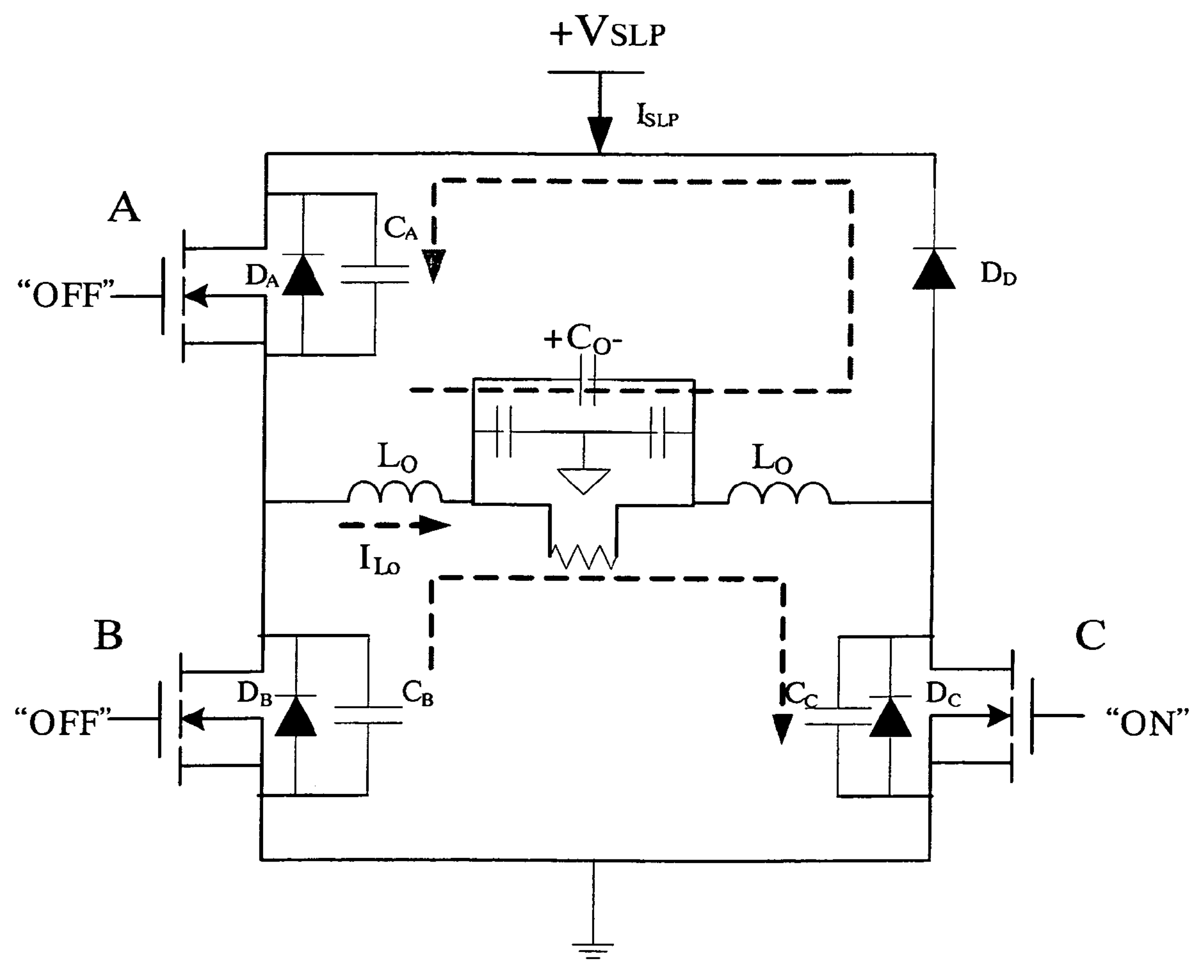
FIG. 7 is a schematic diagram showing charging and discharging paths when the power switch C is turned on in the inverter when operated in Mode II according to the present invention.
Figure 8:
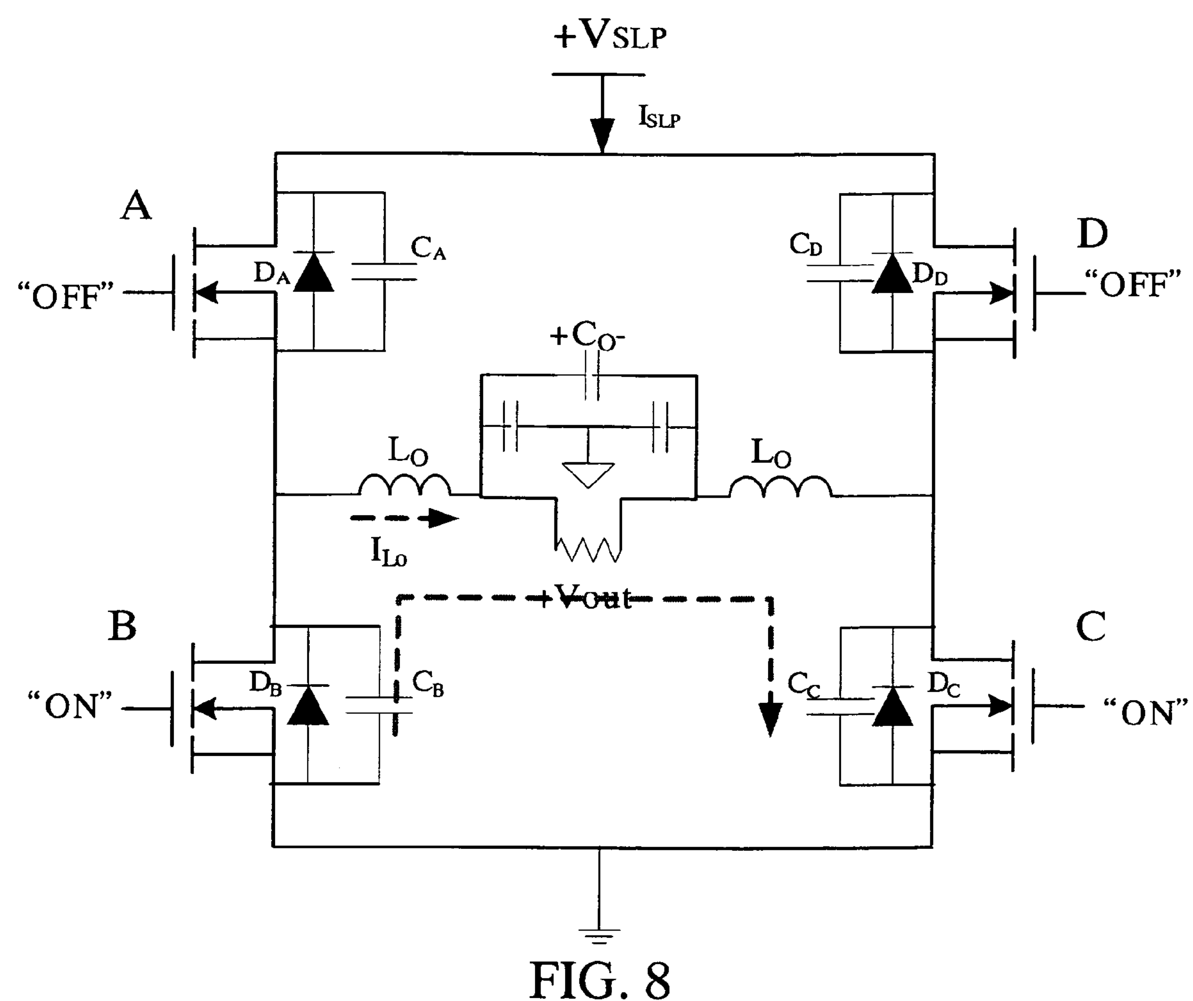
FIG. 8 is a schematic diagram showing the power switches B and C are turned on in the inverter when operated in Mode III according to the present invention.

$(t_1 \leqq t \leqq t_2)$ Mode II:

When $t=t_1$, the power switch A is cut off and the current $I_{LO}$ stops rising. According to the Lenz's law, the current flown through the inductor has to be maintained in a same direction and charges a capacitor $C_A$ and discharges a capacitor $C_B$. At this time, a voltage across the capacitor $C_A$ rises continually and the output voltage $V_{out}$ decreases until a body diode $D_B$ of the power switch B turns on ($t=t_2$) and a voltage across the power switch $C_B$ decreases to zero, shown in FIG. 7.

$(t_2 \leqq t \leqq t_3)$ Mode III:

After Mode II ends, the voltage across the power switch $C_B$ decreases to zero ($t=t_2$) and then $D_B$ turns on, clamping the voltage $V_{DS}$ to be zero and thus enabling the power switch B to turn on. As such, zero voltage switching is achieved and the output voltage $V_{out}$ is zero at this time.

Figure 9:
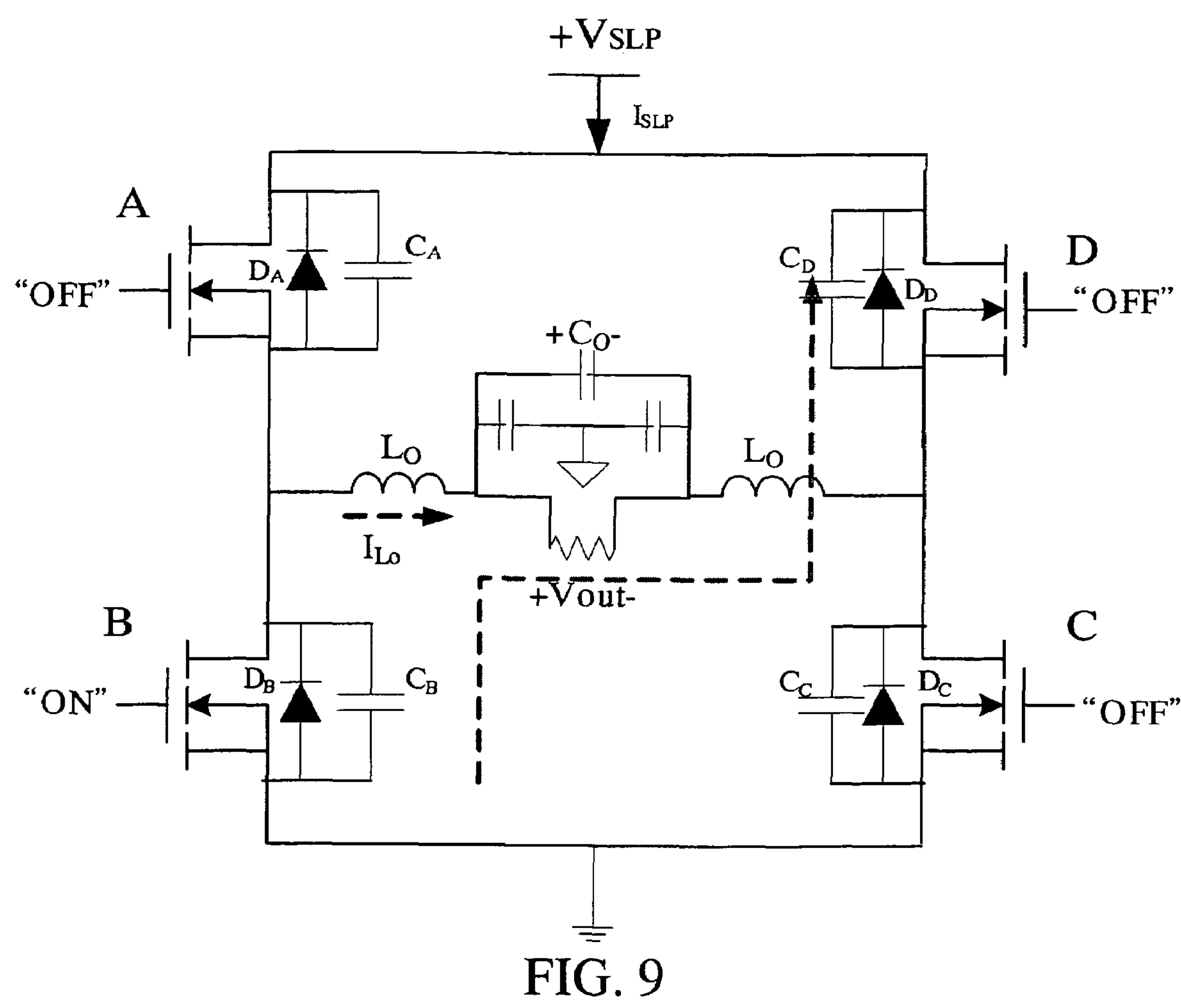
FIG. 9 is a schematic diagram showing charging and discharging paths when the power switch B is turned on in the inverter when operated in Mode IV according to the present invention.
Figure 10:
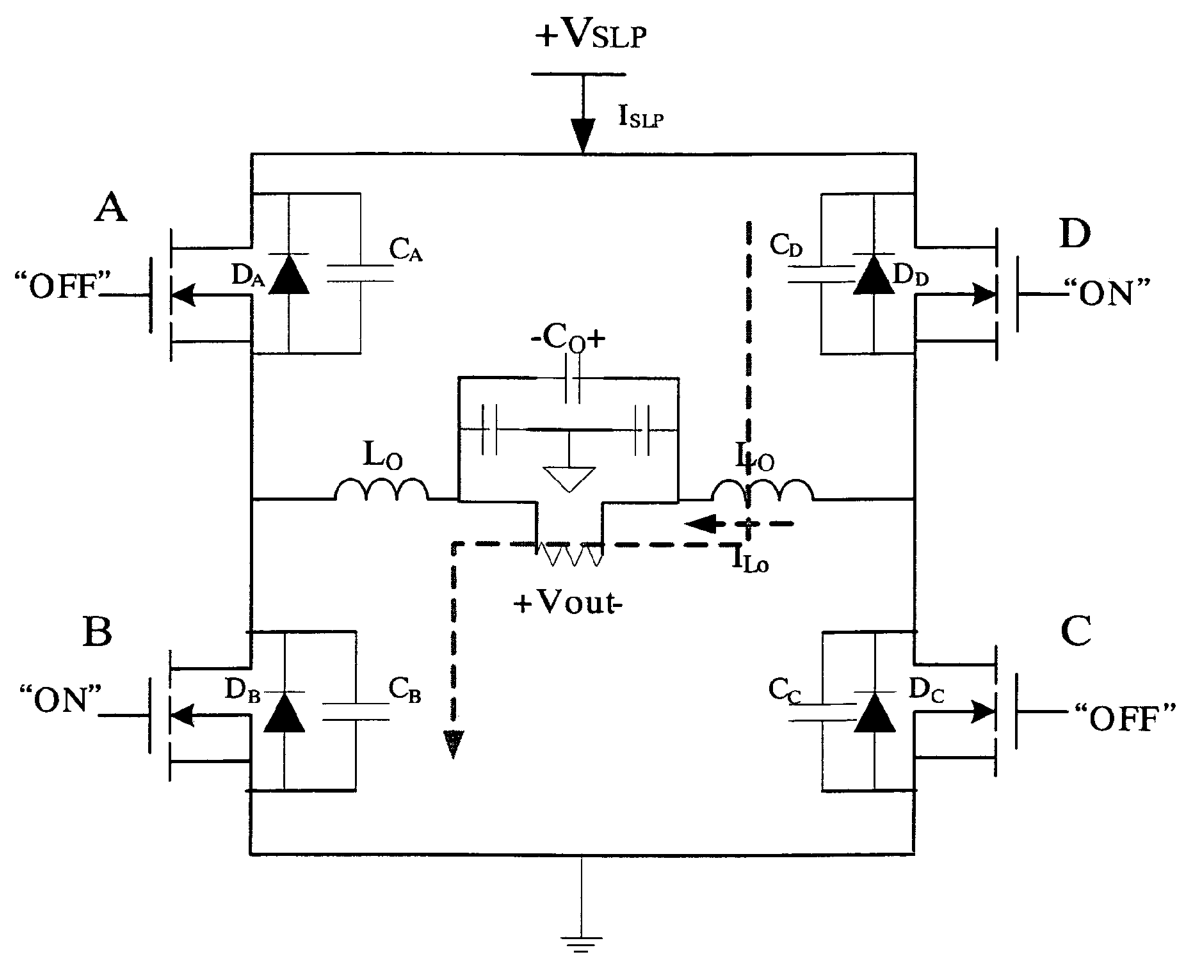
FIG. 10 is a schematic diagram showing that energy is transmitted to the load in the inverter when operated in Mode V according to the present invention.

$(t_3 \leqq t \leqq t_4)$ Mode IV:

When $t=t_3$, the power switch C is cut off and the current $I_{LO}$ charges $C_c$ and discharges the capacitor $C_D$. At this time, a voltage across the capacitor $C_C$ rises continually and the capacitor $C_D$ discharges to zero until a body diode $D_D$ of the power switch D is turned on ($t=t_4$), shown in FIG. 9.

$(t_4 \leqq t \leqq t_5)$ Mode V:

When $t=t_4$, the diode $D_D$ is turned on, enabling the power switch D to be turned on and the power switches A and C to be cut off. At this time, energy transmission is conducted in another half cycle. Next, the output inductor $L_O$ and the output capacitor $C_O$ are again charged. The current $I_{LO}$ has a final value of $I_{LO}$ (t5) equal to $I_{SLP}$, the voltage across the capacitor $C_O$ has a final voltage $V_{CO}$ (t5) equal to $V_{SLP}$. The polarity of the output is shown in FIG. 6. At this time, the output voltage of the circuit $V_{out}=V_{SLP}$.

Figure 11:
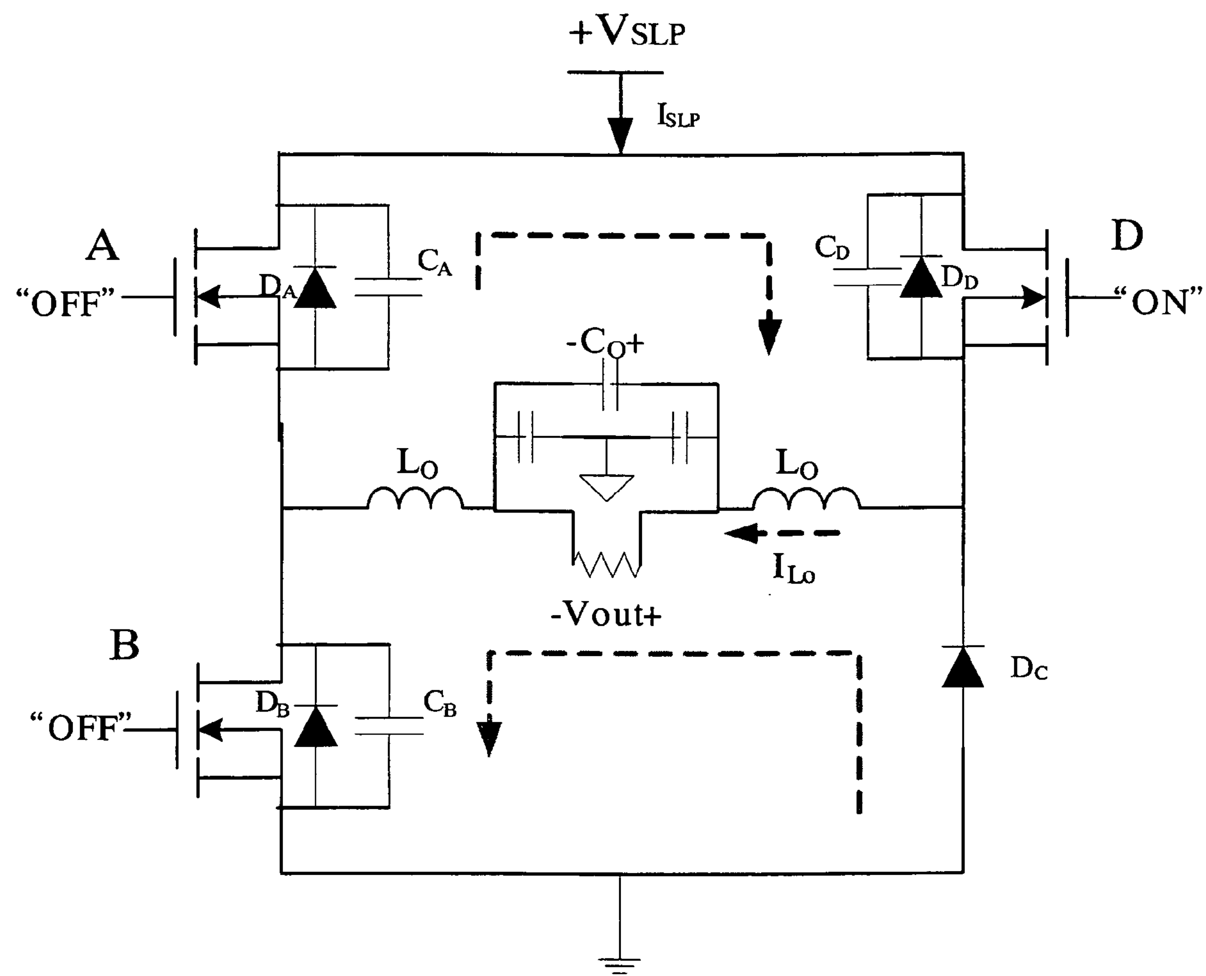
FIG. 11 is a schematic diagram showing charging and discharging paths when the power switch D is turned on in the inverter when operated in Mode VI according to the present invention.

$(t_5 \leqq t \leqq t_6)$ Mode VI:

When $t=t_5$, the power switch B is cut off and the current $I_{LO}$ stop rising. According to the Lenz's law, the current flown through the inductor $L_O$ has to be maintained at a same direction. Accordingly, the current charges the capacitor $C_B$ and discharges $C_A$. At this time, the voltage across the capacitor $C_B$ rises continually until the body diode $D_A$ is turned on ($t=t_6$) and the voltage across the capacitor $C_A$ discharges to zero, shown in FIG. 11.

Figure 12:
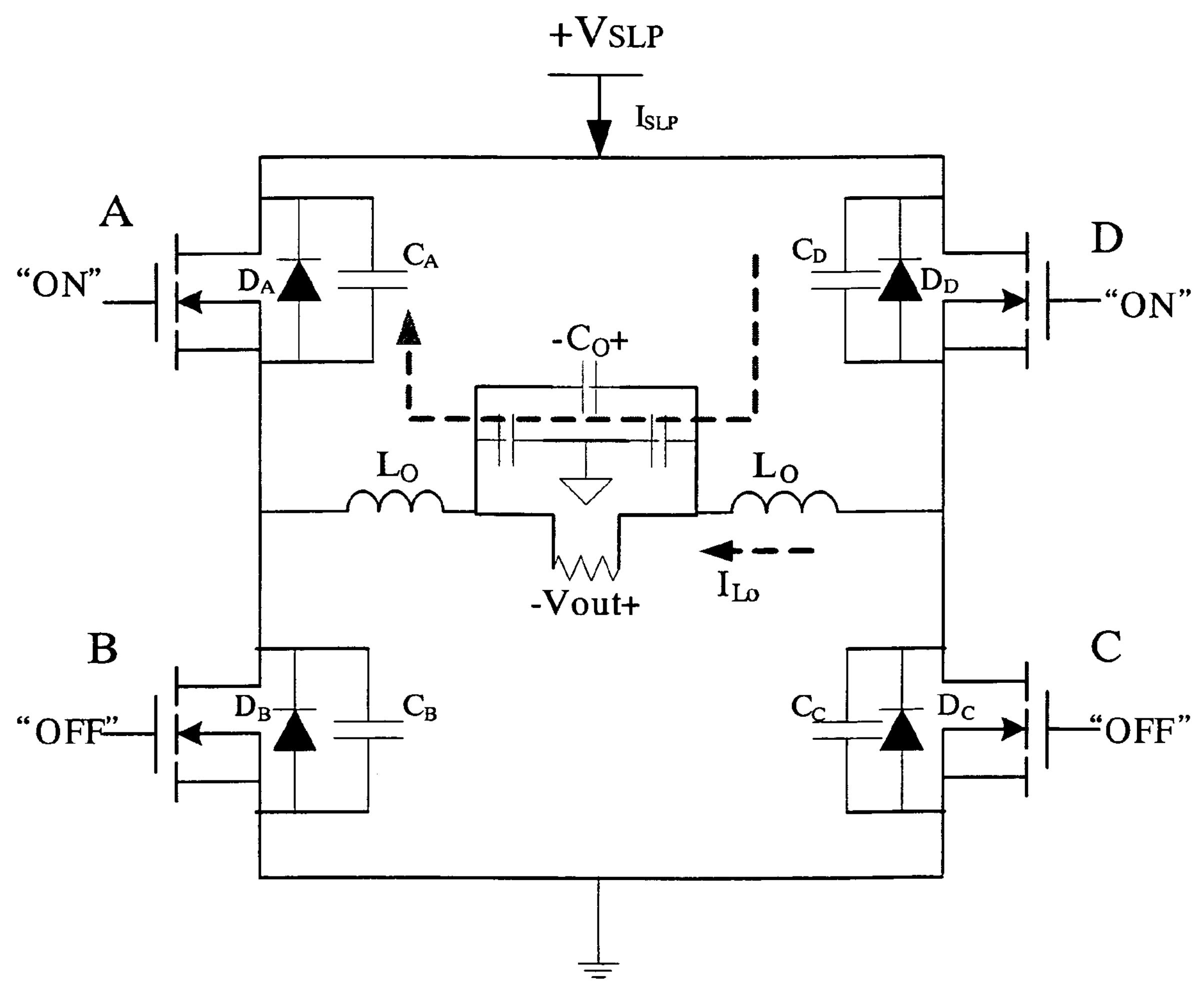
FIG. 12 is a schematic diagram showing the power switches A and D are turned on in the inverter when operated in Mode VII according to the present invention.

$(t_6 \leqq t \leqq t_7)$ Mode VII:

After Mode VI ends, the voltage across the capacitor $C_A$ decreases to zero ($t=t_6$) and then the diode $D_A$ is turned on, clamping the voltage $V_{DS}$ to be zero. At this time, the power switch A is turned on and the purpose of zero voltage switching is achieved, shown in FIG. 12.

Figure 13:
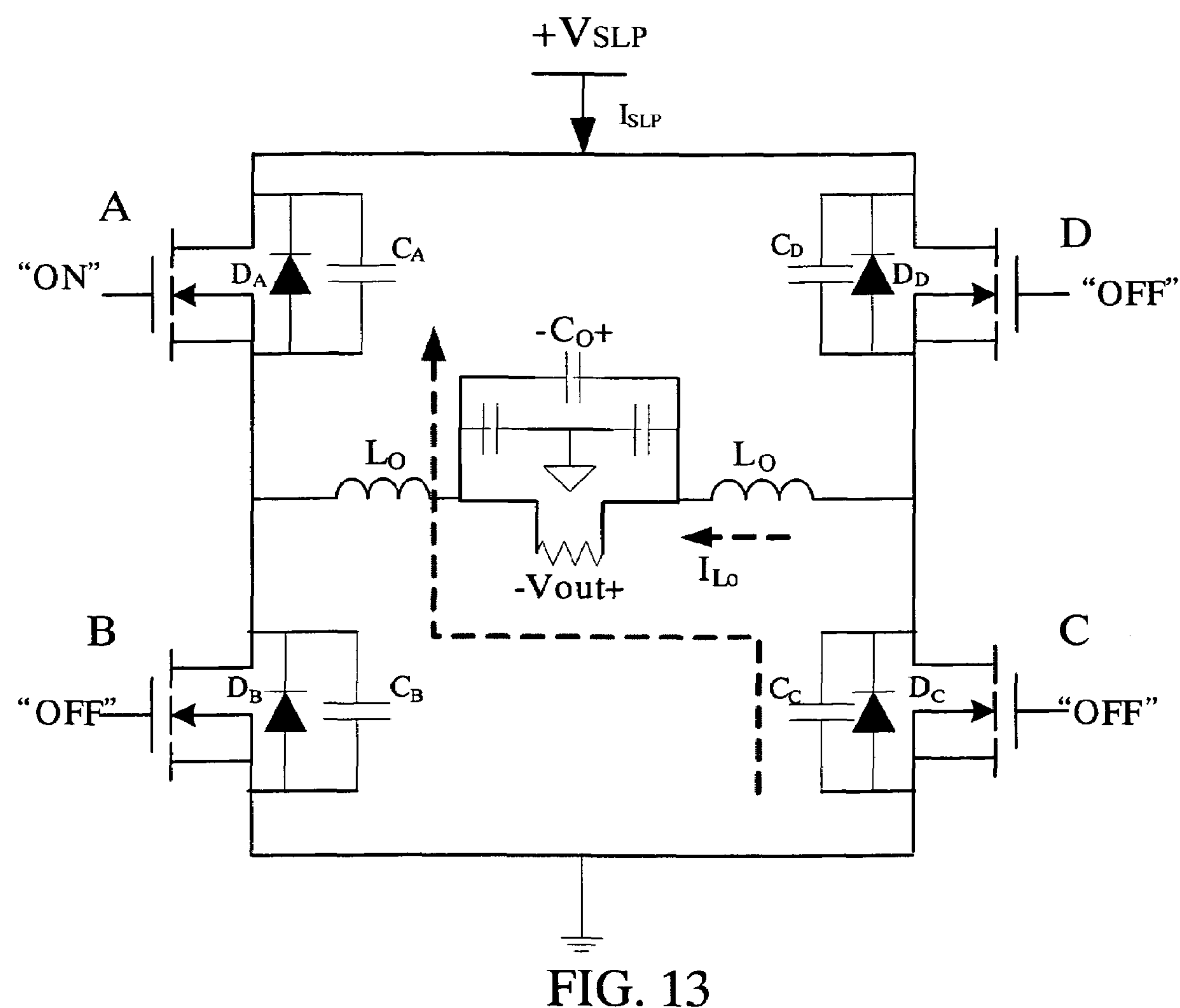
FIG. 13 is a schematic diagram showing charging and discharging paths when the power switch A is turned on in the inverter when operated in Mode VIII according to the present invention.

$(t_7 \leqq t \leqq t_8)$ Mode VIII:

When $t=t_7$, the power switch D is cut off and the current $I_{LO}$ charges the capacitor $C_B$ and discharges the capacitor $C_c$. When $t=t_8$, the capacitor $C_B$ is charged to $V_{SLP}$ and the capacitor $C_C$ discharges to zero until a body diode of the power switch C turns on the diode $D_C$ ($t=t_8$), shown in FIG. 13.

<Simple Embodiments>

Figure 14:
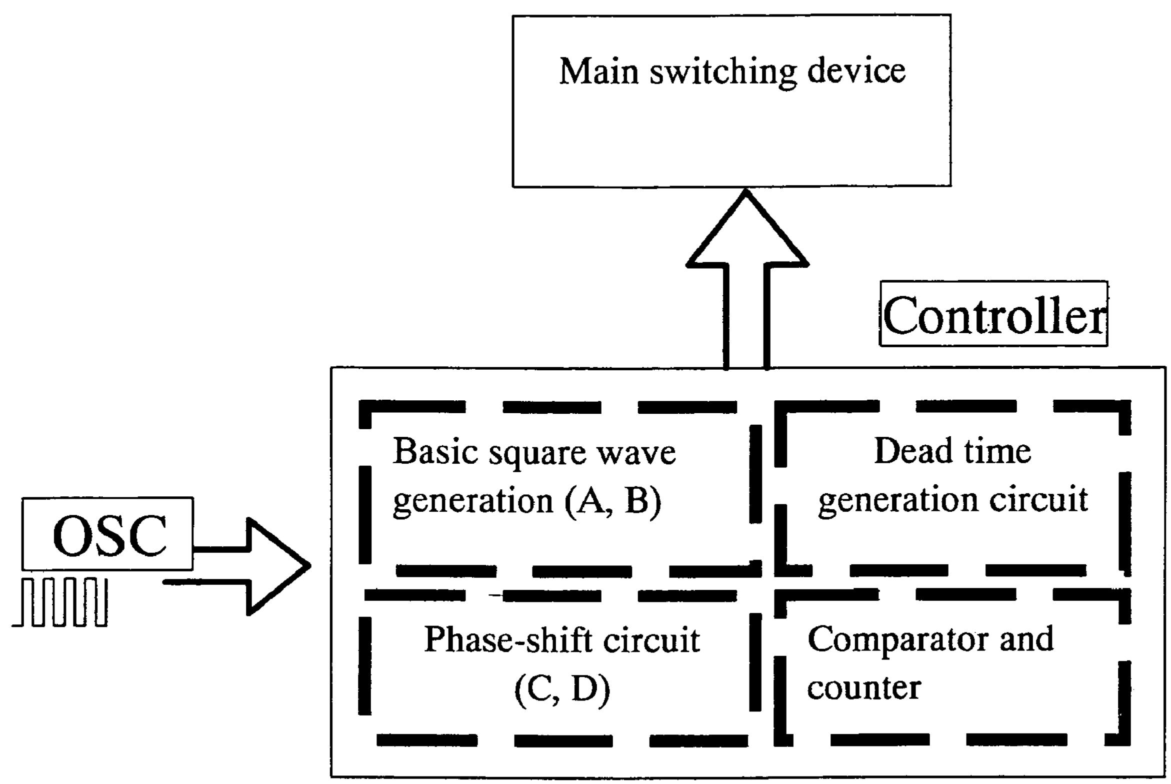
FIG. 14 is a block diagram of a control signal generator according to the present invention.

Unlike the traditional PWM full-bridge inverter, a full-bridge phase-shift zero-voltage-switching modulator achieves control of duty cycle by a phase shift, where $V_{SLP}$ is present on the load only at a time when the power switches A and C or B and D turn on concurrently. To generate such control signals, a phase shift generator and a dead time have to be specified in a controller for generating the control signals. FIG. 14 depicts a block diagram of a control signal generator and will be described in detail for each block thereof.

<Square Wave Generation Circuit in the Controller>

Figure 15:
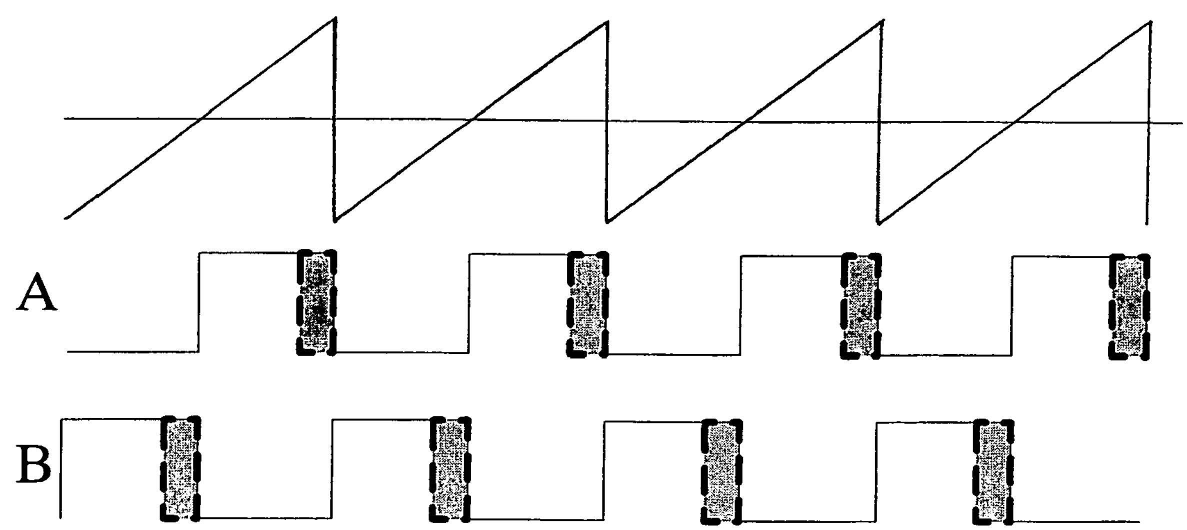
FIG. 15 is a schematic diagram showing output signals of the switching devices A and B according to the present invention.
Figure 16:
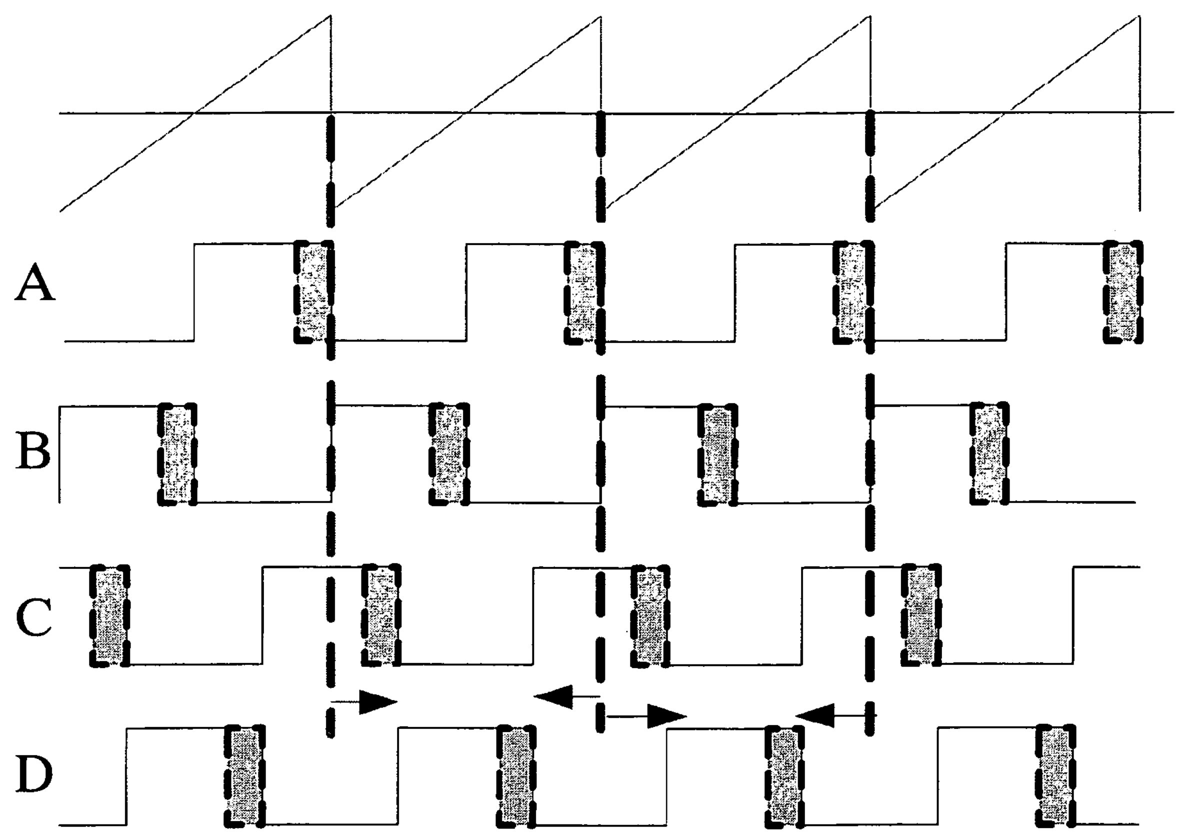
FIG. 16 is a schematic diagram showing output signals of the switching devices A, B, C and D according to the present invention.

In a normal operation, the gate control signals of the power switches A, B are square wave, wherein the switches A, B each have a duty cycle of 50%. The upper-left and lower-left arms of the inverter are provided with opposite outputs. In editing software in the controller, a dead time has to be introduced to prevent the upper and lower bridges from conducting on concurrently and thus preventing the devices thereon from during down, shown in FIG. 15.

<Phase Shift Generation Circuit in the Controller>

The phase shift generation circuit is designed to provide energy transmission and a zero voltage switching mode, which has been discussed in the above in operational principle. During a half cycle, duty ratio of the power switch C is determined by the edited software, the gate control signal of power switch C is symmetrical to the positive edge of the gate control signal of power switch B.

The duty cycle is computed by Eq. 1. To avoid that the upper and lower bridges turn on concurrently and thus burn down the power device, the gate control signal of power switch D is made inversely outputted in relation to the gate control signal of power switch C at the upper arm. A gray zone presents the dead time and a switching time required for the zero voltage switching function.

$$\text{Duty}_{(upper)}=\text{Duty}_{(lower)}=\text{Duty}$$

$$\text{Duty}=t_{ON}\,f \qquad \text{(Eq. 1)}$$

<Counter and Comparator Circuit in the Controller>

The afro-mentioned basic square wave generation circuit and the phase-shift generation circuit have to be operated in cooperation with a basic timing so that they may generate desired square and phase shift, respectively. To this end, a counter is provided in the controller. To provide switching waves for various of duty cycles, a comparator is arranged. For example, to generate a wave of duty cycle of 50% for the switching devices A and B, an input of the comparator is set as one-second of an counting-up range provided by the counter. To generate a variable duty cycle of a following output signal of the switching devices C and D, the input of the comparator has to be proportional to a desired output voltage.

EXAMPLES

Assuming T=1000 and Duty Cycle=100

In a cycle T, the switching device A is set to be "H" for ½T and "L" for ½T. The switching device A has an output inverse to that of the switching device B.

In a ½T period for the switching device C, 20% in 0–500 (0~100) is "H" and 80% (101~500) is "L". Within the range of 501–1000, 80% (501–900) is "L" owing to duty cycle=100 and 20% (901–1000) is "H". The switching device D has an inverse output as compared to that of the switching device C.

Several examples will be described over relationship between duty cycles and the corresponding output waves.

Figure 17:
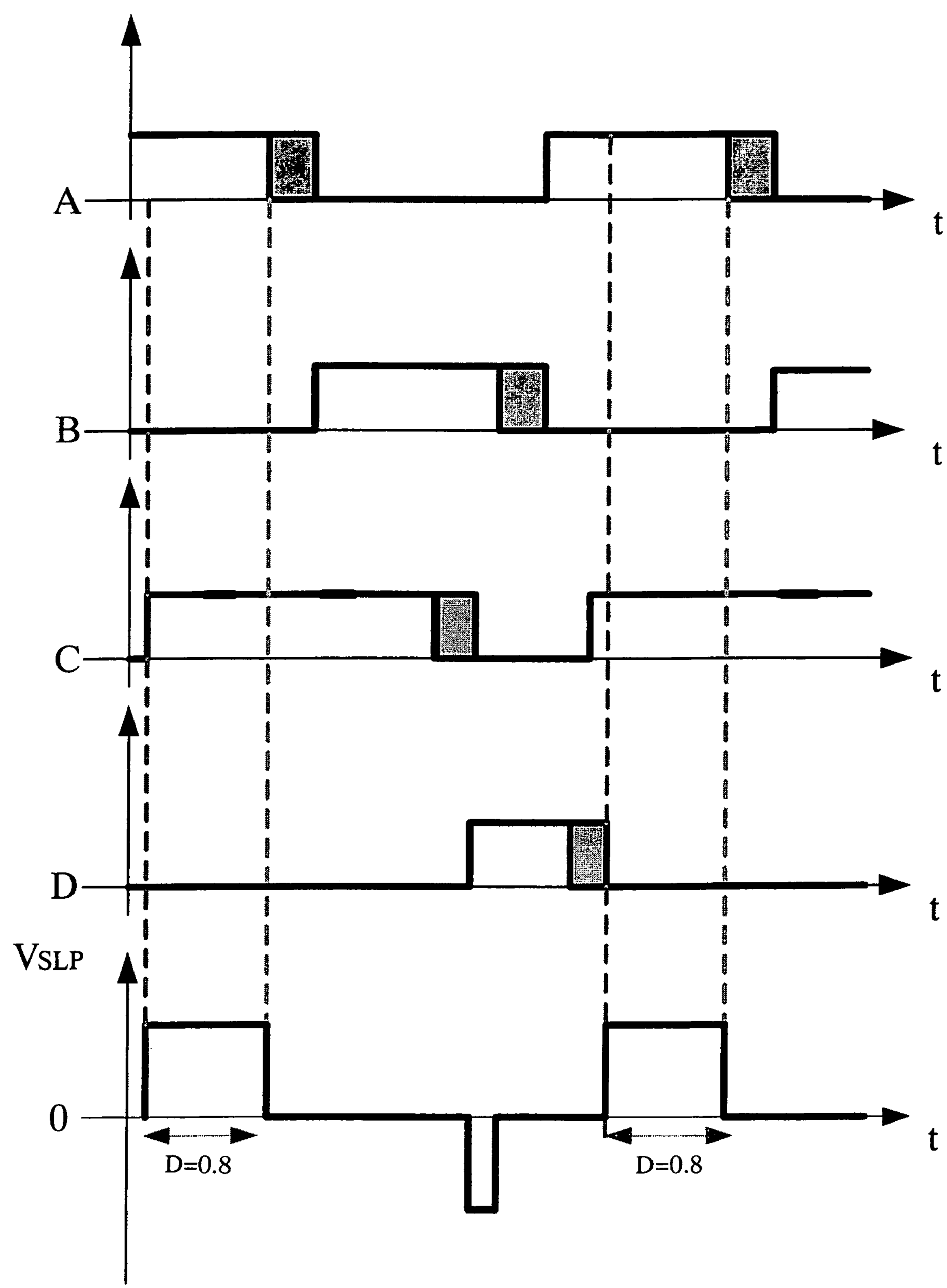
FIG. 17 is a schematic diagram showing the gate control signals and waveforms of output voltages when a duty cycle is 0.8 in the inverter according to the present invention.

(1) Duty cycle=0.8. The corresponding output waveform is shown in FIG. 17.

Figure 18:
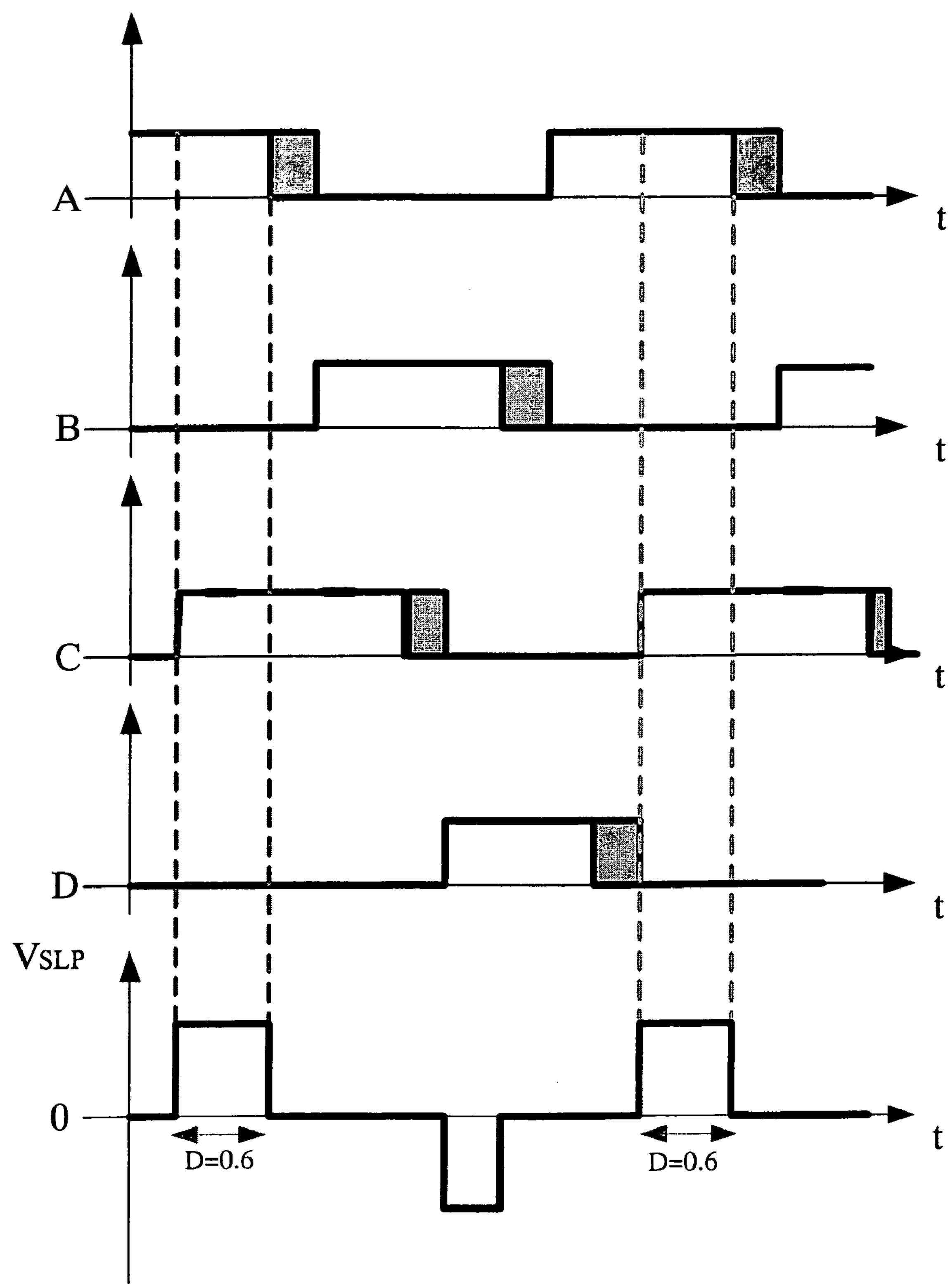
FIG. 18 is a schematic diagram showing the gate control signals and waveforms of output voltages when a duty cycle is 0.6 in the inverter according to the present invention.

(2) Duty cycle=0.6. The corresponding output waveform is shown in FIG. 18.

Figure 19:
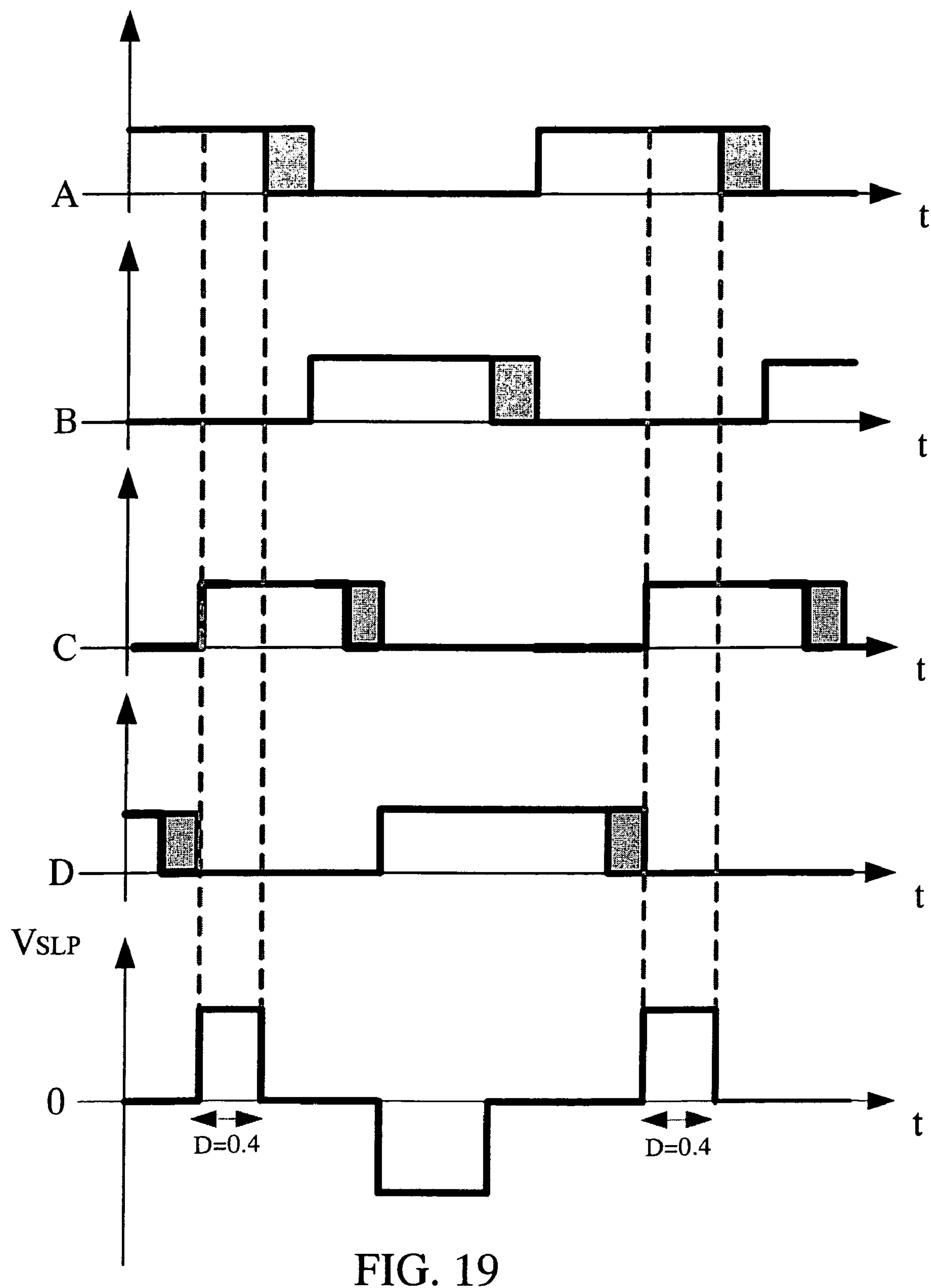
FIG. 19 is a schematic diagram showing the gate control signals and waveforms of output voltages when a duty cycle is 0.4 in the inverter according to the present invention.

(3) Duty cycle=0.4. The corresponding output waveform is shown in FIG. 19.

Figure 20:
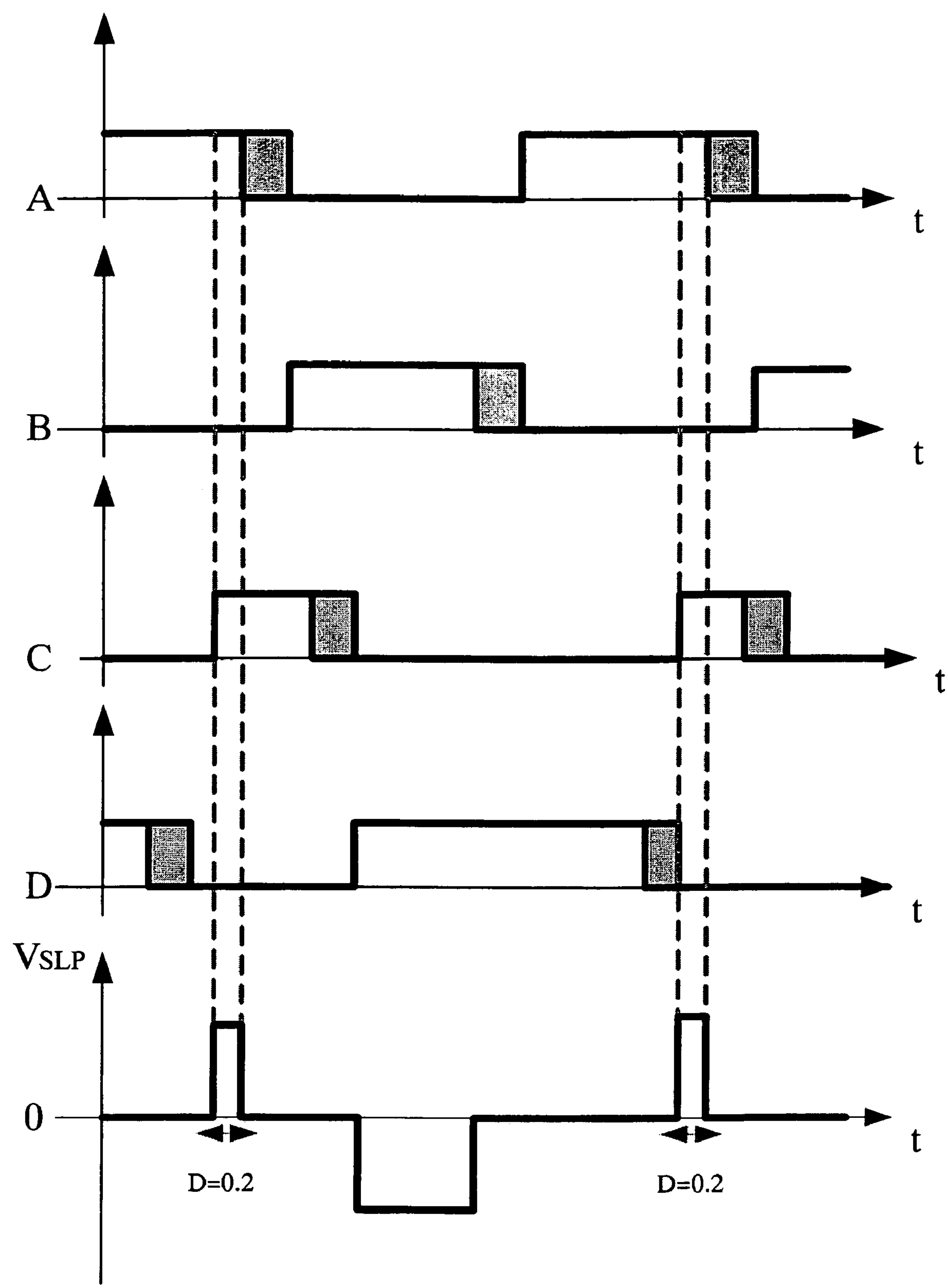
FIG. 20 is a schematic diagram showing the gate control signals and waveforms of output voltages when a duty cycle is 0.2 in the inverter according to the present invention.

(4) Duty cycle=0.2. The corresponding output waveform is shown in FIG. 20.

Figure 21:
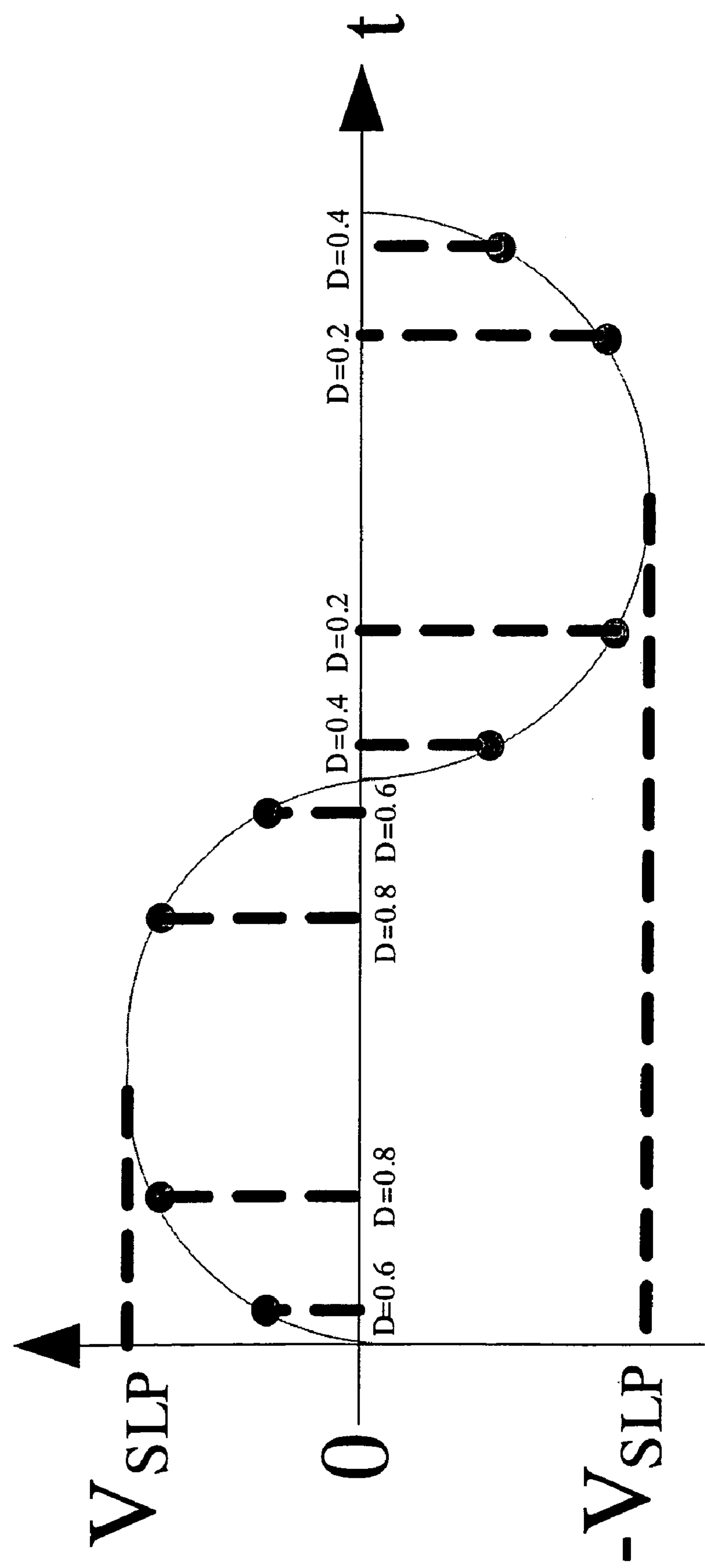
FIG. 21 is a schematic diagram showing the filtered output voltage of sine wave of the inverter according to the present invention.

It may be known through the examples given above, the positive voltage has a greater width and the negative voltage has a less width as the duty cycle is greater. In equivalency, the corresponding output voltage is positive. On the other hand, the positive voltage has a less width and the negative voltage has a greater width as the duty cycle is less. In equivalency, the corresponding output voltage is negative and proportional to the duty cycle. According to the above description with regard to the method of the invention, by varying the duty cycle, an AC voltage between $+V_{SLP}$ and $-V_{SLP}$ may be obtained. FIG. 21 shows a sine wave obtained through the method of the invention. The output voltage is negative when the duty cycle is greater than 0.5. And the greater the duty cycle is, the greater the output voltage is. On the other hand, the output voltage is negative when the duty cycle is less than 0.5. And the lower the duty cycle is, the greater the negative output voltage is.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

The invention claimed is:

1. A modified phase-shift modulation technology applied in a single-phase DC-AC inverter, being capable of soft switching the same, outputting an AC voltage and comprising a controller, the controller comprising:

a basic square wave generation circuit configured to generate a first square wave having a duty cycle of 50%;

a phase shift circuit configured to generate a square wave having a second duty cycle proportional to a desired output and a center line symmetrical with the square wave aforementioned;

a dead time generation circuit adapted to add a dead time into the first and second square waves; and a comparator and a counter adapted to provide timings for the basic square wave generation circuit, phase shift circuit dead time generation circuit.

2. The technology as recited in claim 1, wherein the controller comprises:

a basic square wave generation circuit;

a phase-shift wave generation circuit generating a phase shift amount in relation to an output voltage;

a dead time generation circuit; and a comparator and a counter.

3. The technology as recited in claim 1, wherein the timeings provided by the comparator and counter are generated in a digital manner by a single chip.

4. The technology as recited in claim 1, wherein the timings provided by the comparator and counter are generated by an analog cirucit.

* * * * *